April 27, 1937.  E. SEIBOLD  2,078,287
VARIABLE SPEED TRANSMISSION AND TWO-SPEED PLANETARY GEAR
Original Filed Sept. 9, 1933   2 Sheets-Sheet 1
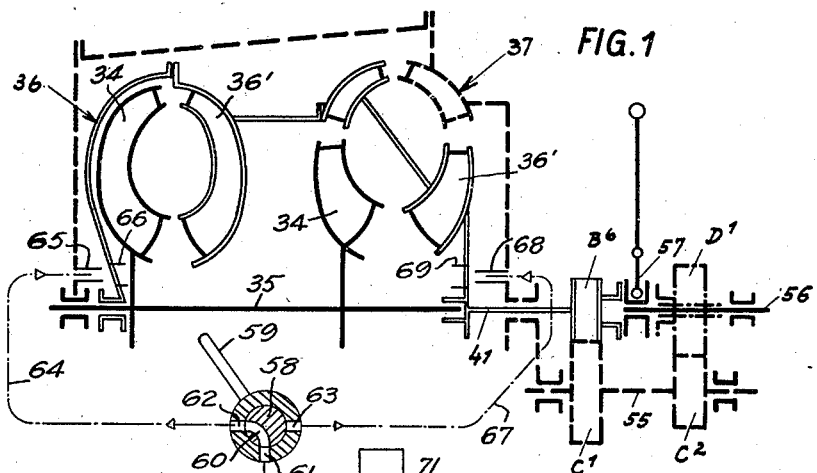
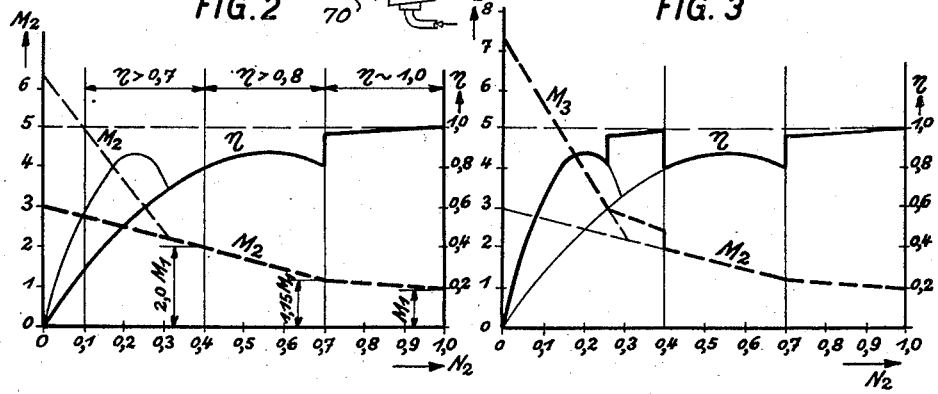
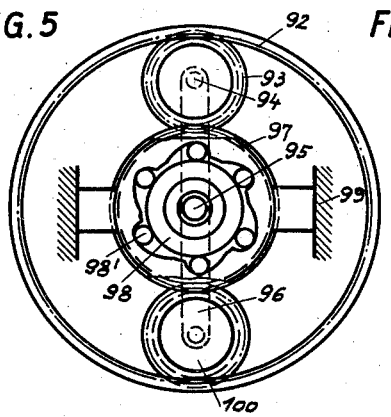
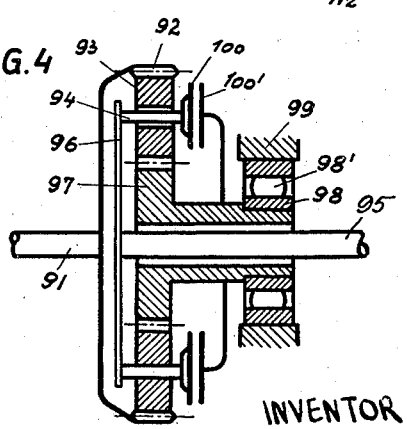
INVENTOR
ERNST SEIBOLD
BY C. P. Goepel
ATTORNEY.

Patented Apr. 27, 1937

2,078,287

UNITED STATES PATENT OFFICE 2,078,287

VARIABLE SPEED TRANSMISSION AND TWO SPEED PLANETARY GEAR

Ernst Seibold, Heidenheim-on-the-Brenz, Germany, assignor to J. M. Voith, Heidenheim a. d. Brenz, a copartnership composed of Walther Voith, Hermann Voith, and Hanns Voith Original application September 9, 1933, Serial No. 688,727. Divided and this application May 23, 1934, Serial No. 727,165. In Germany September 10, 1932

7 Claims. (Cl. 74—293)

My present invention relates to new and useful improvements in self-contained hydraulic transmissions, the invention being more particularly related to hydraulic variable speed transmissions including two speed planetary gearings. This application for patent is a division of my copending application for patent filed September 9, 1933, Serial. No. 688,727.

The application of well-known hydro-dynamic transmissions, based on the principle of circulating liquids as developed by Prof. Herman Foettinger, has heretofore been fundamentally limited due to the fact that, while such transmissions work smoothly and flexibly at the constant speed of the driving shaft, they yield good efficiencies only over a comparatively small speed range of the driven shaft. In many instances, however, it is essential that the primary power be fully available over a range of the secondary speed as great as possible, as for instance, in connection with the power transmission for automotive vehicles. For this reason, hydraulic power transmission has heretofore been inferior, so far as efficiency is concerned, to mechanical transmission with gears or to electrical transmission.

On the other hand, hydraulic transmission possesses advantages over mechanical and electrical transmission in regard to simplicity in operating the same, in wear, safety of operation, weight and cost. These advantages, however, cannot be realized so long as there is no hydraulic transmission which will satisfy the requirement as to efficiency.

The attempt has often been made to obtain good efficiency over a wide range of the secondary speed by shifting some of the wheels or by having some of the wheels intermittently stopped or rotated with other wheels, thus creating several transmission ratios in an effective arrangement. But apparatuses of this kind are objectionable in that they not only embody complicated devices, reducing thereby the safety of operation and the simplicity of control, but they are cumbersome, heavy and expensive.

In accordance with my invention, Serial No. 688,727, filed September 9, 1933, the problem is solved in the most simple manner and with entire safety in operation, through the provision of the several completely self-contained hydraulic transmission or torque changers, each having a different transmission ratio, and so combined and operated that at all times the particular transmission which will most efficiently take care of the torque required is available for selection and operation. The process of changing from one transmission device to another is effected simply by draining the working liquid from the device in operation and concurrently filling the one which will give the desired torque ratio. Pursuant to the principle of my invention, the change from one transmission device to another may be accomplished without affecting the torque on the driven shaft. Important advantages are obtained by combining a hydraulic flow coupling (transmission ratio 1:1) with one or several hydraulic transmissions for stepping down the speed.

My invention may be usefully employed, for example, in connection with automotive vehicles.

One of the objects and purposes of this invention is to combine in an operative self-contained unit two or more torque changers, of which one may be a coupling.

Another object is to provide an arrangement of this character which is operated in accordance with hydraulic flow principles, and to combine therewith a system of mechanical gearing to obtain further changes in speed and torque.

This invention also involves in connection with the primary and secondary shafts, a planetary gear coupling system arranged to drive the secondary shaft from the primary shaft and which is operable in such manner that the secondary shaft can, at will, be driven from the primary shaft either at the same speed rate or at a lower speed.

With the foregoing and other objects in view, the invention consists in the mode of operation and in the construction and arrangement of parts so combined as to coact and cooperate with each other in the performance of the functions and the accomplishment of the results herein contemplated, and comprises in its evolvement the simple and practical examples illustrated in the accompanying drawings, in which:—

Figure 1 is a diagrammatic illustration of a torque changer and coupling combination, showing an arrangement of a hydro-dynamic transmission consisting of one torque changer in combination with a flow coupling with control means for the distribution of the operating fluid, and also showing gearings associated with the driven shaft.

Figure 2 represents an efficiency and torque diagram corresponding to and explanatory of the arrangement of a hydro-dynamic transmission, consisting of two torque changers in combination with a flow coupling.

Figure 3 is a similar diagram corresponding with the arrangement shown in Figure 1.

Figure 4 is a central sectional view through a planetary gear coupling arrangement.

Figure 5 is an end view thereof; and

Figure 6:
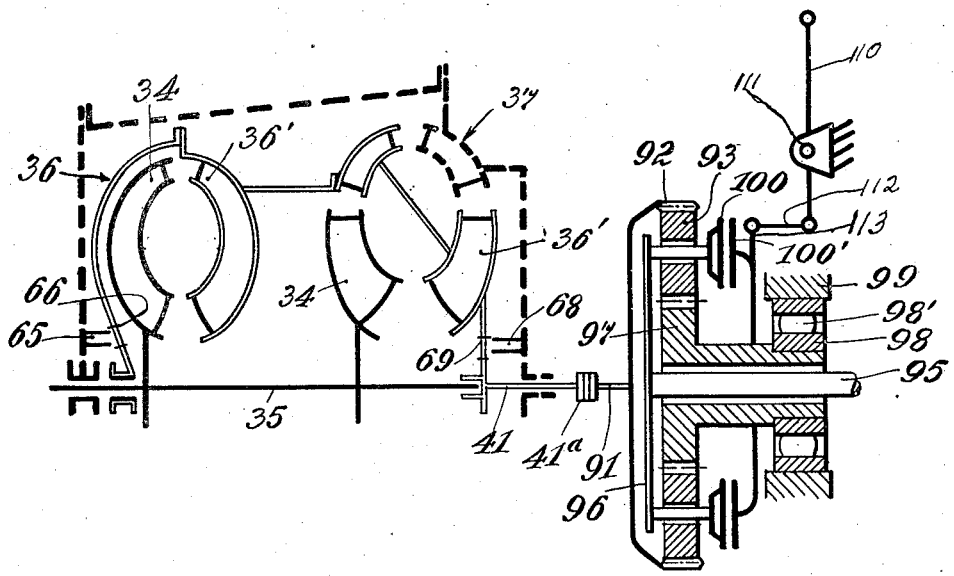
Figure 6 is a diagrammatic illustration of a torque changer and coupling combination showing an arrangement therewith of a planetary gear coupling, such as shown in Fig. 4.

Referring more particularly to Figure 1, I illustrate diagrammatically a hydraulic transmission comprising a coupling 36 in combination with a single torque changer 37, each provided with an impeller element 34 connected with a driving shaft 35 and having connected turbine elements 36' which are connected with the driven shaft 41, and I also show in connection therewith, and more particularly on the side of the driven shaft 41, a transmission gearing system comprising gear $B^6$ on said shaft 41, gears $C^1$ and $C^2$ on a countershaft 55 and a gear $D^1$ on a shaft 56 which is separated from and coaxial with the shaft 41. As illustrated in the drawings, the gear $B^6$ cooperates with the gear $C^1$ while the gear $D^1$ cooperates with the gear $C^2$. A shiftable clutch 57 is provided between the shafts 41 and 56 for controlling this transmission gearing.

This transmission gearing develops the speeds $N_3=0.4N_2$ and correspondingly the torque values $M_3=2.5M_2$. With this arrangement, a characteristic in accordance with Fig. 3 is obtained whereby the part for $N_2=(0.4$ to $1.0) \times N_1$ corresponds to the respective part of diagram Fig. 2, which illustrates the operating characteristics of a hydraulic flow coupling. The values for $N_2<0.4 \times N$ are obtained as reduction therefrom on account of the transmission gear. The maximum torque for $N_2=0$ amounts to $7.5M_1$. In the following table the letters used represent U the torque changer, K the coupling, Z the transmission gear:

Combination

|  | U+Z | | K+Z | | U | | K |
|---|---|---|---|---|---|---|---|
| $N_2$ | 0 | 0.16 | 0.28 | 0.4 | 0.4 | 0.7 | 1.0 |
| $M_2$ | 3.0 | 2.0 | 1.15 | 1.0 | 2.0 | 1.15 | 1.0 |
| M | 7.5 | 5.0 | 2.82 | 2.5 | 2.0 | 1.15 | 1.0 |
| $\eta$ | 0 | >0.8 | ~1.0 | | | >0.8 | ~1.0 |

In order to start quickly it is simpler to skip combination K+Z and to immediately change over from combination U+Z according to the thin, dashed curve to speed U.

The loss in efficiency is of no importance as it is of very short duration, whereas the operating sequence thereby is considerably simplified. On the other hand, for heavily loaded vehicles as well as driving on the up-grade, combination K+Z is of utmost importance.

The essential advantages of the arrangements described are equally simple control of the torque changer as well as the coupling by means of a liquid handling cock or valve, extremely smooth and absolutely shock-free change-over from one transmission ratio to the other, long life, and utmost safety of operation, as well as the possibility of having several motors operating parallel on the same driven shaft. In Fig. 1, I show a distributing valve or cock 58 by means of which to divert operating fluid under pressure either to the coupling 36 or to the torque changer 37. This valve may be operated by any suitable controlling instrumentality, as by an operating lever 59, and it has a passage 60 adapted to provide communication between an inlet port 61 and an outlet port 62 when the valve is in one terminal position, and also to provide communication between the said inlet port 61 and an outlet port 63 when the valve is in its other terminal position. From the outlet port 62, the liquid is conducted through a pipe line 64 to a nozzle 65 disposed to flow the liquid into the revolving coupling 36 through suitable openings as 66. To the revolving torque changer 37, liquid passes from the outlet port 63 through pipe line 67, nozzle 68, and openings as 69. To the inlet port 61, liquid may be passed through a pipe line 70 from a pump 71 or any equivalent means. Through the operation of the distributing valve 58, the coupling may be filled with operating liquid concurrently with the draining of the torque changer, and, conversely, the torque changer may be filled concurrently with the draining of the coupling. By this simple arrangement, it is only necessary to drain the operating liquid from the transmission which is in operation and concurrently fill the other transmission which will give the desired speed and torque.

Figure 2 diagrammatically illustrates the operating characteristics of a normal flow transmission. Assuming, for instance, an internal combustion motor develops a torque $M_1$ at its full speed $N_1$ and a torque $1.15 \times M_1$ at a speed of $0.7 \times N_1$ and that it be equipped with a flow coupling $A^3$, $B^3$ and a hydraulic torque changer $A^2$, $B^2$ in such a way that the torque changer, at a speed $N_2=0.7 \times N_1$, also just develops a torque $M_2=1.15 \times M_1$ if the motor thereby runs at its full speed $N_1$, then, at this point, the torque changer has an efficiency $$\eta = \frac{0.7 \times N_1 \times 1.15 \times M_1}{N_1 \times M_1} =$$

about 0.80. Further assuming that the torque changer has an efficiency of $\eta > 0.8$ down to a speed of $N_2=0.4 \times N_1$ and that at the point in consideration, its efficiency be exactly $\eta = 0.8$, then the torque changer, at this point, develops a torque $$M_2 = \frac{0.8}{0.4} \times M_1 = 2\ M_1$$

Now, if for the speeds $N_2>0.3 \times N_1$, a second torque changer $A^1$, $B^1$ is added which within the range of $N_2=(0.1-0.3) \times N_1$ may have an efficiency $\eta > 0.7$; the efficiencies will vary according to the heavy curve (for $\eta$) and the torque in accordance to the dash curve (for $M_2$) of Fig. 2. Fig. 3 represents a similar diagram corresponding with the arrangement shown in Figure 1.

In Figs. 4 and 5, I disclose a variable gear transmission with planetary gears, the outer gear of which is rigidly connected with the driving shaft in order to provide simple means for changing gears which, with this device, is possible without shifting gears axially, relatively to each other.

Said figures illustrate one possible construction for carrying my objects and purposes into effect.

On the driving shaft 91 an internally toothed gear 92 is arranged which is in gear with planetary pinions 93. These planetary pinions are arranged rotatably around bolts 94, which bolts are rigidly connected with the driven shaft 95 by arms 96. The center or sun-wheel 97 is rotatably supported by shaft 95. It is equipped with friction ratchet gear parts 98, 98' which, cooperating with the housing 99, allow the free rotation of sun-wheel 97 in the direction of rotating of the driving shaft, but prevent a rotation in the reverse direction. A detachable coupling, comprising cooperating parts 100, 100', makes it possible to fixedly connect sun-wheel 97 with the driven shaft 95.

The device functions as follows: When the coupling parts 100, 100' are disconnected as illustrated in Fig. 4, the sun-wheel would, due to the resisting turning moment on shaft 95, together with arms 96 turn in the opposite direction of rotation if it was not prevented from doing so by the friction ratchet gear parts 98, 98', the effect of this being that a stepping down of the speed from shaft 91 to shaft 95 takes place. When the coupling parts 100, 100' are engaged, the planetary gears 93 are no longer free to move relatively to the sun-wheel 97 which also prevents them from rotating relatively to outer gear 93, so that both shafts are interlocked and necessarily rotate with the same speed. This arrangement offers the important advantage that the ratchet gear parts 98, 98' as well as the coupling parts 100, 100' have to be designed only for a fraction of the total torque to be transmitted. Another advantage is found in the fact that with the coupling engaged, the gears are not in relative motion to each other and therefore no loss due to friction in the gears takes place. The device represents a very compact and light unit.

Referring to Figure 6, the nozzle 65 is supplied with a supply pipe 64 (see Fig. 1), through which fluid enters the opening 66 of coupling 36, or fluid under pressure may be diverted to the torque changer 37, the liquid passing through nozzle 68 and openings 69, as explained in connection with Fig. 1.

The shaft 41 may be coupled in any suitable manner by coupling 41a, to the shaft 91 in which an internally toothed gear 92 is arranged and which is in gear with planetary pinions 93, as further explained herein in connection with Figs. 4 and 5. A lever 110 is pivoted at 111, and, by links 112 and 113, acts to set into operation, or to put out of operation, the parts just referred to and more particularly described in connection with Figs. 4 and 5.

While my improvements have been illustrated, it is realized that in practice various changes and alterations may be made in the same, and further that the improvements are capable of embodiment in different constructions. It has been sought herein to illustrate only such embodiments as will suffice to exhibit the character of the improvements. Reservation is, therefore, made to the right and privilege of changing the form of the details of construction as herein presented or otherwise altering the arrangement of the parts without departing from the spirit or scope of the improvements or the scope of the appended claims.

I claim:—

1. A hydro-dynamic variable speed power transmission having coupling and torque changer devices for circulating liquid, each provided with an impeller element and a turbine element, means for controlling the circulating liquid in said devices whereby to change the speed ratio thereof, primary and secondary shafts, the former connected with the impeller elements of the two devices and the latter connected with the turbine elements thereof and including first and second shaft parts, a mechanical gearing system interposed between the first and second shaft parts, said system including change speed gears adapted to drive the second part at a different speed from that at which the first part is driven by the hydraulic devices.

2. A hydro-dynamic variable speed power transmission having at least one coupling device and at least one torque changer device for circulating liquid, each provided with an impeller element and a turbine element, a control for the circulating liquid whereby to step down the speed ratio of the transmission, a primary shaft connected with the impeller elements of the two devices, a secondary shaft including an intermediate portion connected with the turbine elements of the two devices and a propeller portion, a planetary gear system interposed between the intermediate portion and propeller portion and normally acting to move the propeller portion at reduced speed, and including a gearing having normally free unidirectional movement, and means for locking such gearing rigid with the other gears of the system to obtain the same speed of the two driven portions synchronized with the speed of the turbine elements of the coupling and torque changer obtained through control of the circulating liquid effected in said devices.

3. A hydro-dynamic variable speed power transmission according to claim 1, in which the mechanical gearing system includes means to effect a direct connection between said first and second parts.

4. A hydro-dynamic variable speed power transmission according to claim 2, in which a ratchet gear having arrangement in the interposed planetary gear system acts to control the operation of that gearing having normally free unidirectional movement.

5. In a hydro-dynamic variable speed power transmission which includes circulating liquid controlled coupling and torque changer devices operable at different speeds and torque and having a secondary shaft on the driven side thereof, a shaft member aligned with the secondary shaft, to be driven thereby, with a mechanical gearing system between said shaft and member, including a change speed gearing normally assembled to drive said member at a different speed from that at which the secondary shaft is driven by the coupling and torque changer devices, and means for causing one gearing of the assembly to become a direct drive for operating said member in the same direction and at the same speed as the secondary shaft which is operated by said devices through control of the circulating liquid therein.

6. In a hydro-dynamic variable speed power transmission which includes circulating liquid controlled coupling and torque changer devices having a secondary shaft on the driven side thereof, a shaft member aligned with the secondary shaft, to be driven thereby, with a gear system between said shaft and member comprising an internal gear attached to the secondary shaft, planetary gears engaged with the internal gear and attached to the shaft member to drive the shaft member at reduced speed, a sun gear loosely surrounding the shaft member and engaged with the planetary gears, a ratchet gear cooperating with a stationary member and acting on the sun gear to allow rotation of the latter only on the direction of the rotation of the secondary shaft, and a normally free locking device adapted to lock the sun gear and planetary gears together to move together as an entity with the rotation of the secondary shaft from the rotation obtained through control of the circulating liquid effected in said devices.

7. In combination with a coupling device and a torque changer device forming a hydro-dynamic variable speed power transmission, in which each device is characterized by having an impeller element and a turbine element, means for synchronously driving the impeller elements of the two devices, a driven shaft and a propeller shaft, said driven shaft being connected with the turbine elements of the two devices, means for driving the propeller shaft from the driven shaft, including an internal gear rigid with the driven shaft, a sun gear loosely surrounding the propeller shaft, planetary gears meshing between the internal gear and sun gear and supported on axes rigid with the propeller shaft, mechanical means for causing the sun gear to rotate in the direction of the rotation of the internal gear, and means for controlling the circulation of liquid in said devices and effective to step down the speed ratio of the transmission.

ERNST SEIBOLD.